(12) United States Patent
La Blanc et al.

(10) Patent No.: US 7,177,958 B1
(45) Date of Patent: Feb. 13, 2007

(54) AUTOMATED INPUT DETERMINATION

(75) Inventors: Sylvester La Blanc, Issaquah, WA (US); Matthew Cibelli, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 10/740,936

(22) Filed: Dec. 19, 2003

(51) Int. Cl.
*G06F 3/00* (2006.01)
*G06F 13/12* (2006.01)
*G06Q 99/00* (2006.01)

(52) U.S. Cl. .............................. 710/16; 710/5; 710/18; 710/62; 710/72; 705/1

(58) Field of Classification Search ................. 710/33, 710/34, 38
See application file for complete search history.

(56) References Cited

U.S. PATENT DOCUMENTS

| | | | | |
|---|---|---|---|---|
| 5,854,945 A | * | 12/1998 | Criscito et al. | 710/62 |
| 6,115,678 A | * | 9/2000 | Lieb et al. | 702/122 |
| 6,216,183 B1 | * | 4/2001 | Rawlins | 710/100 |
| 6,263,383 B1 | * | 7/2001 | Lee et al. | 710/38 |
| 6,986,462 B2 | * | 1/2006 | Venkatesh et al. | 235/383 |
| 2004/0103037 A1 | * | 5/2004 | Wetmore et al. | 705/26 |

* cited by examiner

*Primary Examiner*—Kim Huynh
*Assistant Examiner*—Alan S. Chen
(74) *Attorney, Agent, or Firm*—Todd R. Frenek; Westman, Champlin & Kelly P.A.

(57) ABSTRACT

The present invention relates to a computer-implemented method that includes receiving a sequence of input values. Furthermore, the method includes determining if the sequence of input values is a manual input or an automated input.

21 Claims, 5 Drawing Sheets

AUTOMATED INPUT DETERMINATION

BACKGROUND OF THE INVENTION

The present invention relates to determining a source of data input. In particular, the present invention relates to determining whether an input is from an automated input source or a manual input source.

There are a number of different input devices that communicate with a computer. In some instances, multiple input devices pass through a single port when connecting to the computer. For example, retail input devices can include a keyboard for manual input, a barcode scanner for scanning barcodes and a magnetic stripe reader for reading a magnetic stripe on a credit card. Since the input from the keyboard, barcode scanner and magnetic stripe reader all pass through the same port, it is difficult to determine the source of the input. Thus, software applications running on the computer are unable to make a distinction between manual keyboard input from a user and automated input from an automatic device such as a barcode scanner or magnetic stripe reader.

Allowing software applications to distinguish between manual input and automated input can provide a more productive user interface for systems that communicate with a plurality of input devices through a single port. Additionally, a user does not have to prompt or otherwise prepare the computer for a scan originating from an automated input device such as a barcode scanner or a magnetic stripe reader. Thus, there is a need for a system and method for determining the source of an input received from a plurality of devices through a single port.

SUMMARY OF THE INVENTION

The present invention relates to a computer-implemented method that includes receiving a sequence of input values. The method also includes determining if the sequence of input values is a manual input or an automated input.

Another aspect of the present invention is a computer readable medium. The computer readable medium includes an input device handler module adapted to receive a sequence of input values from one of a plurality of input devices. The input device handler module is also adapted to determine if the sequence of input values is a manual input or an automated input.

Yet another aspect of the present invention is a system including a computer having a memory and an input port. A plurality of input devices including at least one manual input device and at least one automated input device and each input device is operably coupled to the input port to send a sequence of input values to the input port. An input device handler module is stored on the memory and adapted to receive a particular sequence of input values from the input port and determine which one of the plurality of input devices sent the particular sequence of input values.

DETAILED DESCRIPTION OF THE PREFERRED EMBODIMENTS

Figure 1:
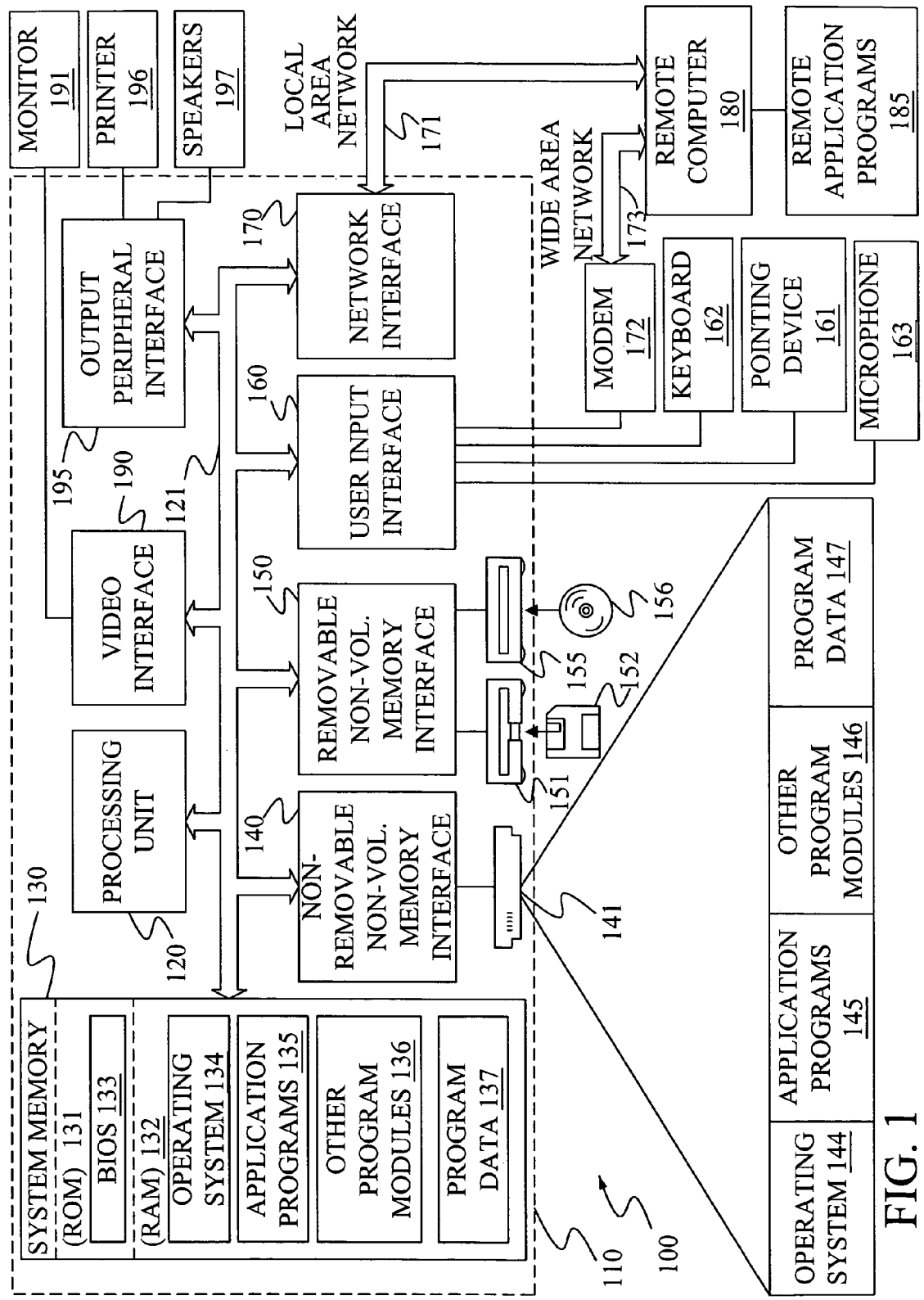
FIG. 1 is a block diagram of a general computing environment in which the present invention can be useful.

Prior to discussing the present invention in greater detail, one embodiment of an illustrative environment which the present invention can be used will be discussed. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable medium.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available medium or media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
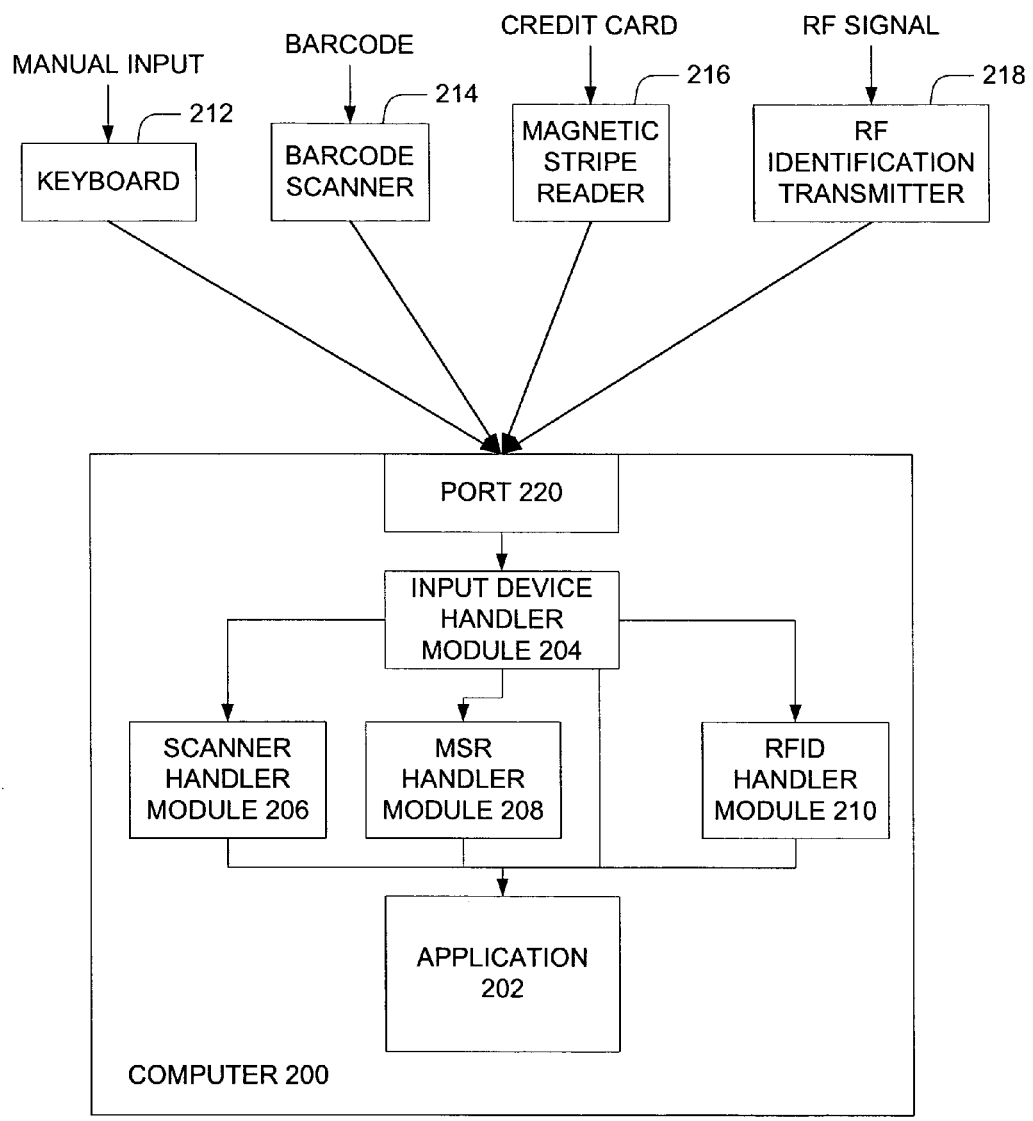
FIG. 2 is a block diagram of a plurality of input devices providing input to a computer.

FIG. 2 illustrates an environment wherein a plurality of input devices communicate with a computer 200, an example of which is described above with respect to FIG. 1. Computer 200 includes at least one application 202, an input device handler 204, a scanner handler module 206, a magnetic stripe reader handler module 208 and a RF identification handler module 210. A plurality of input devices including a keyboard 212, a barcode scanner 214, a magnetic stripe reader 216 and a RF identification receiver 218 communicate through a port 220 to computer 200. Scanner handler modules 206, magnetic stripe handler module 208 and RF identification handler module 210 are associated with and adapted to handle input received from barcode scanner 214, magnetic stripe reader 216 and RF identification receiver 218, respectively. As appreciated by those skilled in the art, other input devices may also be used in accordance with the present invention and multiple input devices can share a common form factor and/or input conduit. Keyboard 212 receives manual input from a user, barcode scanner 214 scans a barcode, magnetic stripe reader 216 reads a magnetic stripe of a credit card and RF identification receiver 218 receives radio frequency signals that are sent to port 220. In accordance with the present invention, multiple ports similar to port 220 that are operably coupled to separate input devices can also be used. Each of the multiple ports can provide information received from a respective input device to input device handler module 204. As used herein, manual input refers to input that is manually entered by a user, such as through a keyboard. Automated input refers to input that is automatically sent to the computer upon a scan, read or other action, such as a credit card number resulting from magnetic stripe reader 216 reading a credit card.

Input device handler 204 receives input from the plurality of devices through port 220. In an exemplary embodiment, the input includes a sequence of input values that relate to various information, such as a customer name, product identification number and credit card account number. Based on timing characteristics of the input received through port 220, input device handler 204 can make a determination whether the input received came from a manual source such as keyboard 212 or from an automated source such as barcode scanner 214, magnetic stripe reader 216 or RF identification receiver 218. Timing characteristics refer to the time that input values are received. In one embodiment, input device handler 204 associates each input value with a time stamp to analyze timing characteristics of a sequence of input values. Manual input will have a slower and less regular rate of data input for a sequence of input values than input from an automated device. Based on the content of the input, input device handler 204 may provide the input data to application 202, scanner handler module 206, magnetic stripe reader handler module 208 or RF identification handler module 210.

Figure 3:
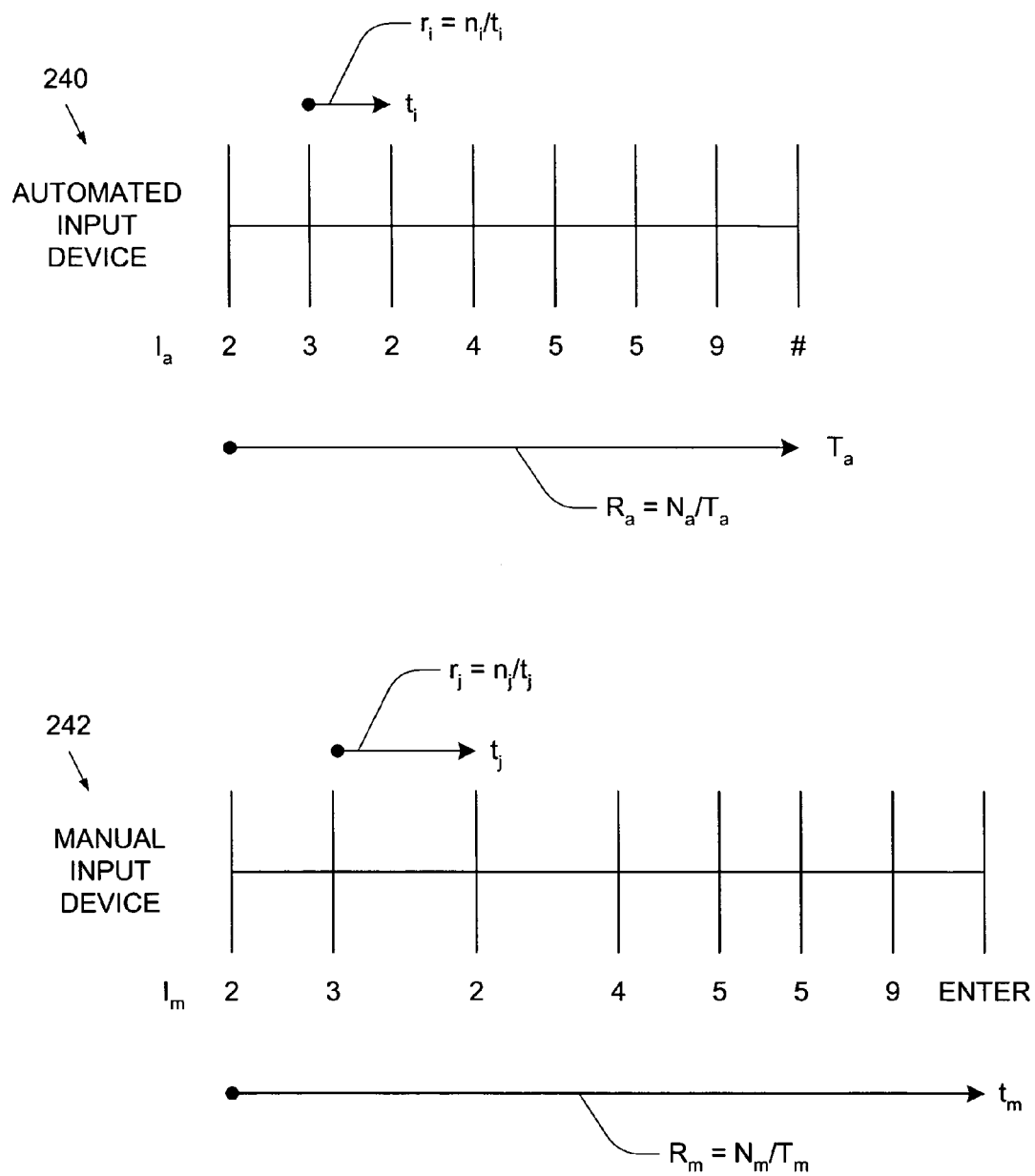
FIG. 3 is a timing diagram for input received from an automated input device and a timing diagram for input received from a manual input device.

FIG. 3 illustrates a timing diagram 240 for input of a sequence of input values received from an automated input device and a timing diagram 242 for input of a sequence of input values received from a manual input device. Each of the input values in sequence $I_a$ and $I_m$ has an associated time stamp based on the time the input value was received. Timing diagrams 240 and 242 illustrate distinguishing timing features of the input of a sequence that comes from an automated input device and a manual input device. Input device handler 204 uses these features in order to make a determination of whether the input received is from an automated device or a manual device.

An overall data rate can be used to aid in determining the source of a sequence of input values. The overall data rate refers to the number of input values in the sequences divided by the total time taken to receive the input values. For example, an automated input device sends input $I_a$, which is shown in timing diagram 240 and includes the sequence 2-3-2-4-5-5-9-#. The input $I_a$ may be a product number "2-3-2-4-5-5-9", where '#' is an optional sentinel sent by the input device signaling the end of input $I_a$. An overall data rate $R_a$ for $I_a$ can be calculated by dividing the number of input values received $N_a$ (in this case nine) by the total time $T_a$ it takes to receive the input. Timing diagram 242 can be used to calculate an overall data rate $R_m$ for the input of sequence $I_m$. Rate $R_m$ can be calculated by dividing the number of input values received $N_m$ (in this case nine) in sequence $I_m$ by the total time $T_m$ it takes to receive the input.

When comparing rates $R_a$ and $R_m$, rate $R_a$ has a greater rate of input values per time period than rate $R_m$. Thus, a determination can be made that input $I_a$ came from an automated source and input $I_m$ came from a manual source. At some times, one-to-one comparison between overall data rates is not available. Thus, a threshold rate can be established, wherein a data rate can be compared to the threshold rate. In one embodiment, a data rate above the threshold rate can be determined as manual input while a data rate below the threshold can be determined as automatic input.

Additionally, data rates between adjacent values in a sequence of input values or a selected number or portion of input values in the sequence can also be calculated in order to determine a source of an input sequence. For example, the rate $r_i$ of the input received between the values '3' and '2' in timing diagram 240 can be calculated by taking the number two and dividing it by the time $t_i$ it takes to receive the two values '3' and '2'. Likewise, the rate $r_j$ can be calculated by dividing the number two by the time $t_j$ it takes to receive the two input values '3' and '2'.

Intermittent rates $r_i$ and $r_j$ can be calculated for adjacent values or a selected number portion or input values received that are shown in timing diagrams 240 and 242, respectively. Rates calculated for $r_j$ (manual input) will experience greater variance and also have larger rate values than rates $r_i$ (automatic input). By comparing rates $r_i$ and $r_j$, input device handler 204 can distinguish between automated input and manual input. A threshold rate or threshold variance value may also be established so that intermittent rates can be compared to the threshold and/or threshold variance value to aid in making a determination of the source of input.

Figure 4:
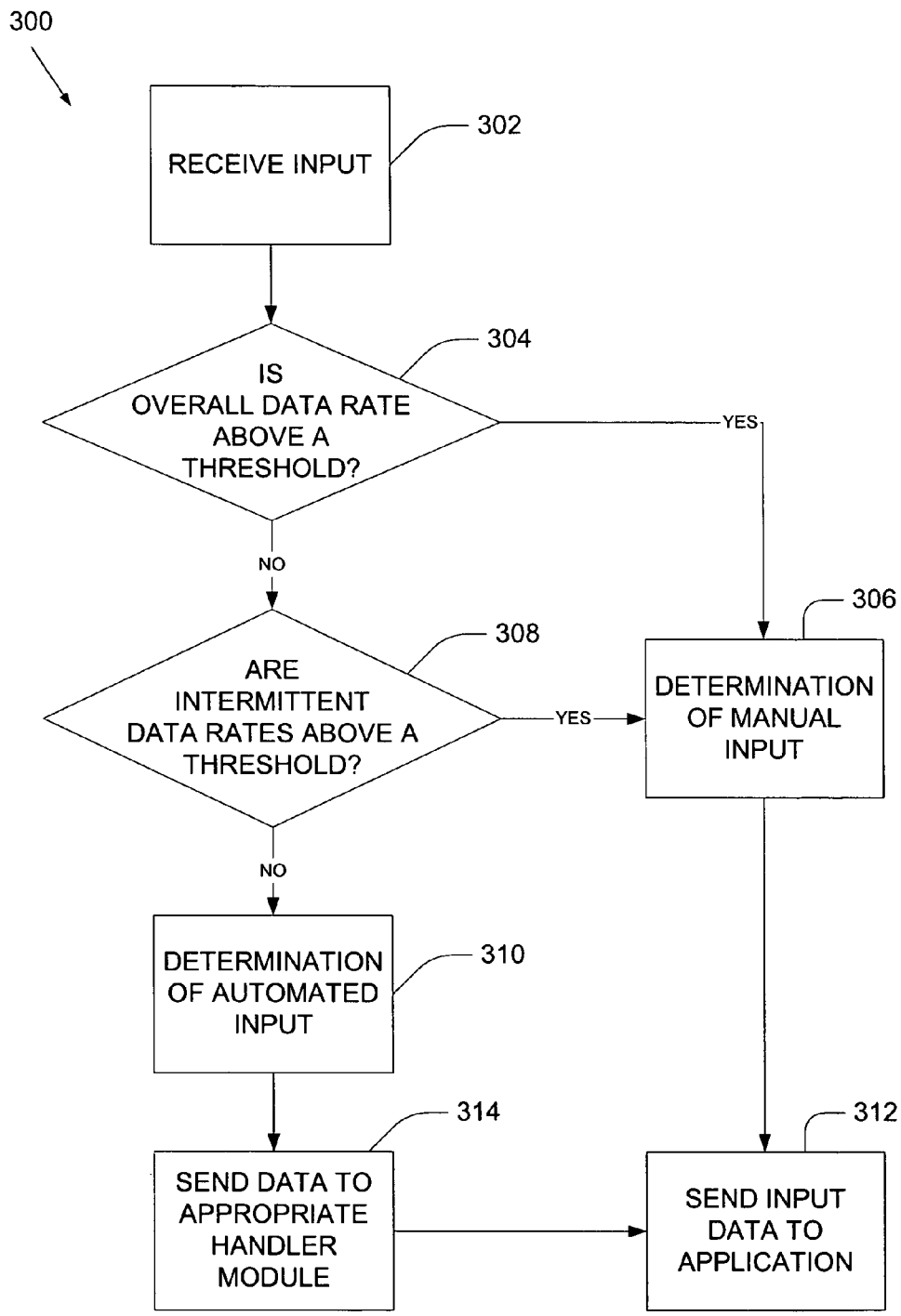
FIG. 4 is a block diagram of an exemplary method according to one embodiment of the present invention.

FIG. 4 illustrates an exemplary method 300 for making a determination between automated input and manual input. Other methods of determining the source of input can be used in accordance with the present invention. At step 302, input is received by input device handler 204. At step 304, the overall data rate is evaluated to determine if the overall data rate is above a threshold. If the overall data rate is above the threshold, the method proceeds to step 306, where it is determined that manual input has been received. If the overall data rate is below a particular threshold, the method proceeds to step 308, where it is determined if intermittent data rates for segments of the input are above a particular threshold. If one or more of the data rates are above a particular threshold, the method proceeds to step 306 where it is determined that the input was from a manual input device. If the data rates are below a particular threshold, the method proceeds to step 310, where it is determined that the input came from an automated input device.

From step 306, method 300 proceeds to step 312, wherein the data that has been input is sent to an application, such as application 202. After step 310, the method proceeds to step 314, where data can be sent to an appropriate module, such as scanner handler module 206, magnetic stripe reader handler module 208 or RF identification handler module 210 depending on the content of the input. By analyzing the content of the input received, input device handler 204 can determine the automated device that sent the data. For example, a magnetic stripe reader can provide input in a particular format such as through the use of various characters to delimit portions of data and handler 204 can recognize the format and send input data to magnetic stripe reader handler module 210. After performing step 314, method 300 proceeds to send data to the application in step 312.

Figure 5:
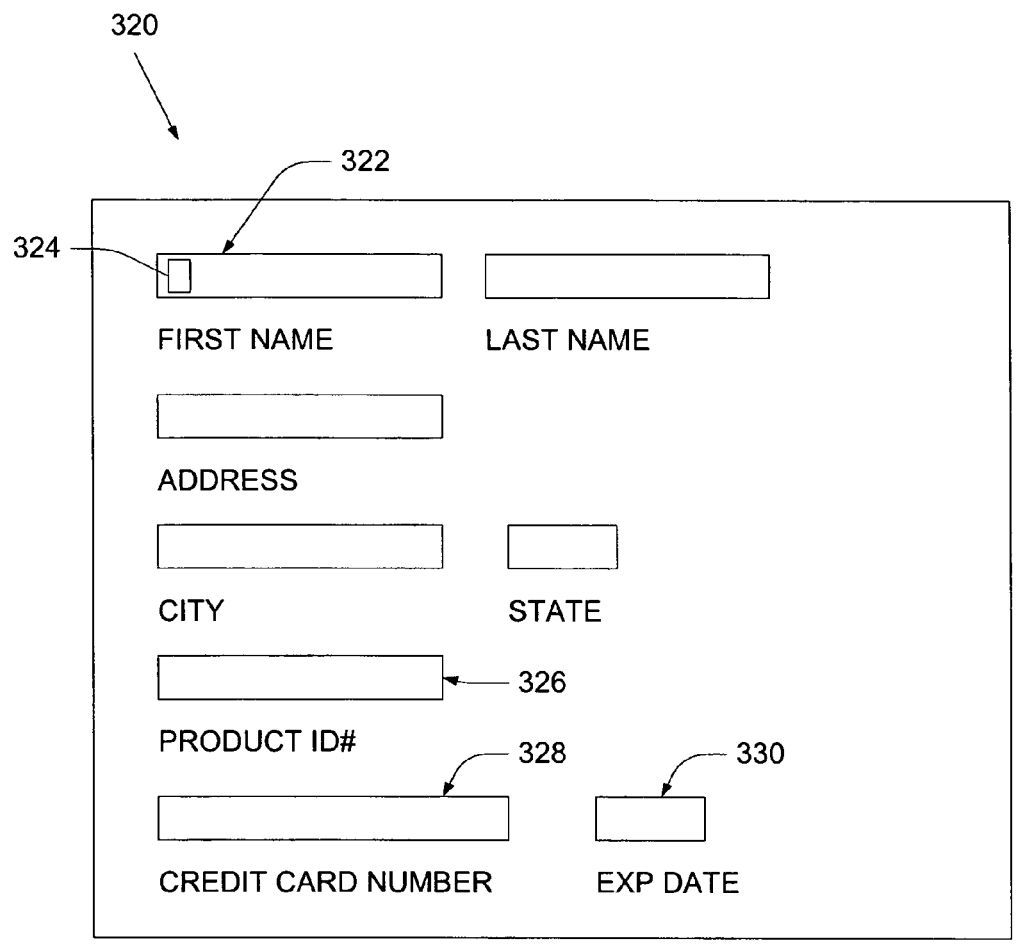
FIG. 5 is a block diagram of a computer display.

FIG. 5 illustrates a display screen 320 used by application 202 to display data related to a sales transaction. A plurality of fields are listed on display 320 related to the transaction. By analyzing the timing characteristics and the content of the input received through port 220, input device handler 204 can send manual input data directly to application 202 or to the appropriate handler module, for example, scanner handler module 206, magnetic stripe reader handler module 208 and RF identification handler module 210. In one embodiment, the content can be compared to a particular format expected, for example a credit card format received from a magnetic stripe reader. When application 202 receives input from the various handler modules, application 202 can determine the appropriate field to place the input data into.

For example, in the case of manual input from keyboard 212, application 202 can place the input data into active field 322. The active field 322 includes a cursor 324 visible to a user. If the input is from bar code scanner 214, application 202 can place the input into product ID field 326. If the input data is from magnetic stripe reader 216, application 202 can place the data into credit card number field 328 and expiration date field 330. As a result, a user does not need to change the active field based upon the input being provided to application 202. For example, the user will not have to change the active field to field 326 or otherwise notify a computer before performing a scan with bar code scanner 214. Thus, a more efficient and user-friendly interface for managing transactions is realized.

Although the present invention has been described with reference to preferred embodiments, workers skilled in the art will recognize that changes may be made in form and detail without departing from the spirit and scope of the invention.

What is claimed is:

1. A computer implemented method, comprising:
   receiving a sequence of input values from a retail input device;
   monitoring to determine whether the sequence of input values is a manual input or an automatic input; and
   once it is determined the sequence of values is automatic input, then determining content to be entered into a retail application, analyzing the content of the sequence of input values to determine a particular automatic input device from a plurality of automatic input devices that provided the sequence of input values, accessing a plurality of fields in the retail application and filling a particular field of the plurality of fields in the retail application with at least a portion of the content based at least in part on the particular automatic input device.

2. The method of claim 1 and further comprising:
   analyzing timing characteristics of the sequence of input values.

3. The method of claim 1 and further comprising:
   calculating an overall data rate for the sequence of input values; and
   comparing the overall data rate to a threshold.

4. The method of claim 1 and further comprising:
   calculating intermittent data rates for the sequence of input values; and
   comparing the intermittent data rates to a threshold.

5. The method of claim 1 and further comprising:
   parsing at least a portion of the content into a credit card number and an expiration date for the credit card number; and
   filling a credit card number field and an expiration date field of the plurality of fields in the retail application with the credit card number and the expiration date, respectively.

6. The method of claim 1 wherein the sequence of input values is received from one of a keyboard, a barcode scanner, a magnetic stripe reader and an RF identification receiver.

7. The method of claim 1 and further comprising associating a time stamp with each of the input values in the sequence of input values.

8. A computer-readable storage medium having instructions for handling input from at least one manual input device and a plurality of automatic input devices, comprising:
   an input device handler module adapted to receive a sequence of input values from one of the at least one manual input device and the plurality of automatic input devices, monitoring to determine whether the sequence of input values is manual input or automatic input and, once it is determined the sequence of input values is automatic input, determine content to be entered into an application and analyze content of the sequence of input values to determine a particular automatic input device that provided the sequence of input values; and
   a retail application adapted to receive the content from the input device handler module, the retail application having a plurality of fields and adapted to fill a particular field of the plurality of fields with at least a portion of the content based at least in part on the particular automatic input device.

9. The computer-readable storage medium of claim 8 wherein the input device handler module is further adapted to analyze timing characteristics of the sequence of input values.

10. The computer-readable storage medium of claim 8 wherein the input device handler module is adapted to calculate an overall data rate for the sequence of input values and compare the overall data rate to a threshold.

11. The computer-readable storage medium of claim 10 wherein the input device handler module is further adapted to calculate intermittent data rates for the sequence of input values and compare the intermittent data rates to a threshold.

12. The computer-readable storage medium of claim 8 wherein the retail application is adapted to parse the content into multiple fields and fill multiple fields of the plurality of fields with the entire content.

13. The computer-readable storage medium of claim 8 wherein the plurality of input devices includes at least one of a keyboard, a barcode scanner, a magnetic stripe reader and an RF identification receiver.

14. The computer-readable storage medium of claim 8 wherein the input device handler module is further adapted to associate a time stamp with each of the input values in the sequence of input values.

15. A retail system comprising:
   a computer having memory and an input port;
   a plurality of retail input devices including at least one manual input device and at least two automatic input devices, wherein each input device of the plurality of input devices is operably coupled to the input port to send a sequence of input values to the input port; and
   an input device handler module stored on the memory and operably coupled to the input port to receive a particular sequence of input values from one of the plurality of input devices, monitoring to determine whether the particular sequence of input values is manual input or automatic input and, once it is determine the particular sequence of input values is automatic input, determine content to be entered into an application and analyze the content of the particular sequence of values and determine which one of the at least two automatic input devices sent the particular sequence of input values based on the content; and
   a retail application stored in the memory and adapted to receive the content from the input device handler module, the application having a plurality of fields and adapted to fill a particular field with at least a portion of the content based at least in part on said one of the at least two automatic input devices.

16. The system of claim 15 wherein the input device handler module is further adapted to analyze timing characteristics of the particular sequence of input values.

17. The system of claim 15 wherein the input device handler module is further adapted to calculate an overall data rate for the particular sequence of input values and compare the overall data rate to a threshold.

18. The system of claim 17 wherein the input device handler module is further adapted to calculate intermittent data rates for the particular sequence of input values and compare the intermittent data rates to a threshold.

19. The system of claim 15 wherein the application is further adapted to parse at least a portion of the content into a credit card number and an expiration date for the credit card number and fill a credit card number field and an expiration date field of the plurality of fields with the credit card number and the expiration date, respectively.

20. The system of claim 15 wherein the at least one manual input device is a keyboard and the at least one automated device is one of a barcode scanner, a magnetic stripe reader and an RF identification receiver.

21. The system of claim 15 wherein the input device handler module is further adapted to associate a time stamp with each of the input values in the particular sequence of input values.

* * * * *